(12) United States Patent
Hawkins et al.

(10) Patent No.: US 12,185,737 B2
(45) Date of Patent: Jan. 7, 2025

(54) SUPERCOOLED BEVERAGE NUCLEATION AND ICE CRYSTAL FORMATION USING A HIGH-PRESSURE GAS

(71) Applicant: THE COCA-COLA COMPANY, Atlanta, GA (US)

(72) Inventors: Alan Lee Hawkins, Conyers, GA (US); Ryan West, Newnan, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 891 days.

(21) Appl. No.: 17/273,957

(22) PCT Filed: Sep. 6, 2019

(86) PCT No.: PCT/US2019/050010
§ 371 (c)(1),
(2) Date: Mar. 5, 2021

(87) PCT Pub. No.: WO2020/051491
PCT Pub. Date: Mar. 12, 2020

(65) Prior Publication Data
US 2021/0315231 A1 Oct. 14, 2021

Related U.S. Application Data

(60) Provisional application No. 62/727,867, filed on Sep. 6, 2018.

(51) Int. Cl.
*A23G 9/04* (2006.01)
*A23G 9/06* (2006.01)
(Continued)

(52) U.S. Cl.
CPC ............... *A23G 9/045* (2013.01); *A23G 9/06* (2013.01); *A23G 9/22* (2013.01); *A23L 2/54* (2013.01)

(58) Field of Classification Search
CPC .. A23G 9/045; A23G 9/06; A23G 9/22; A23L 2/54; B67D 1/0057; B67D 1/0857; B67D 1/0888; B67D 1/124; B67D 1/1252
(Continued)

(56) References Cited

U.S. PATENT DOCUMENTS 5,518,177 A 5/1996 Weaver et al.
6,250,084 B1 6/2001 Sato et al.
(Continued)

FOREIGN PATENT DOCUMENTS

CN 110494043 A 11/2019
EP 0050113 A1 4/1982
(Continued)

OTHER PUBLICATIONS

English translation of office action issued in Japanese Application No. 2021-512568, mailed Aug. 4, 2023.
(Continued)

*Primary Examiner* — Dana Ross
*Assistant Examiner* — Joseph W Iskra
(74) *Attorney, Agent, or Firm* — Meunier Carlin & Curfman LLC (57) ABSTRACT

The present disclosure relates generally to a beverage nucleator system that can initiate ice crystal nucleation by application of a directed flow of pressurized gas to the exterior of the fluid container containing a supercooled beverage. More specifically, the present disclosure relates to a beverage nucleator system for a supercooled beverage container which may include a frame having a beverage container aperture for receiving a beverage container therein and a gas outlet positioned within the beverage container aperture for directing a flow of pressurized gas at a beverage container received therein.

12 Claims, 4 Drawing Sheets

(51) Int. Cl.
*A23G 9/22* (2006.01)
*A23L 2/54* (2006.01)

(58) Field of Classification Search
USPC .............................................. 99/275
See application file for complete search history.

(56) References Cited

U.S. PATENT DOCUMENTS

| | | | |
|---|---|---|---|
| 6,305,178 | B1 | 10/2001 | Shi et al. |
| 10,393,427 | B2* | 8/2019 | Shuntich .................. F25D 3/08 |
| 2001/0000848 | A1* | 5/2001 | Cosman ................ F25D 29/001 |
| | | | 62/65 |
| 2005/0142268 | A1* | 6/2005 | Scullion .................. C12H 1/18 |
| | | | 426/524 |
| 2010/0218510 | A1 | 9/2010 | Kim et al. |
| 2010/0319363 | A1* | 12/2010 | Dieckmann ........... F25D 31/007 |
| | | | 165/84 |
| 2011/0049258 | A1 | 3/2011 | Lehner et al. |
| 2015/0264968 | A1 | 9/2015 | Shuntich |
| 2017/0024950 | A1 | 1/2017 | Roekens et al. |
| 2020/0008448 | A1 | 1/2020 | Sekita |

FOREIGN PATENT DOCUMENTS

| | | |
|---|---|---|
| GB | 2289425 A | 11/1995 |
| GB | 2318112 A | 4/1998 |
| JP | H0911760 A | 5/1997 |
| JP | H11221059 A | 8/1999 |
| JP | 2009165392 A | 7/2009 |
| JP | 2016182103 A | 10/2016 |
| WO | 2015112192 A1 | 7/2015 |
| WO | 2015188068 A1 | 12/2015 |
| WO | 2018102434 A1 | 6/2018 |

OTHER PUBLICATIONS

International Search Report and Written Opinion for International Application No. PCT/US2019/050010 dated Dec. 26, 2019.
Extended European Search Report issued in EP19857149.9, mailed May 16, 2022.
English translation of Office Action issued in connection with Chinese Application No. 201980070684.3, mailed Mar. 25, 2024.

* cited by examiner

SUPERCOOLED BEVERAGE NUCLEATION AND ICE CRYSTAL FORMATION USING A HIGH-PRESSURE GAS

CROSS REFERENCE TO PRIORITY APPLICATION

This application is the national stage entry of International Patent Application No. PCT/US2019/050010 having a filing date of Sep. 6, 2019, which claims the benefit of U.S. Provisional Patent Application Ser. No. 62/727,867 filed Sep. 6, 2018, both of which are expressly incorporated herein by reference.

TECHNICAL FIELD

This invention relates generally to a supercooled beverage and more particularly to an ice crystal nucleator for supercooled beverages to initiate ice crystal nucleation in conventional beverage bottles, cans and other containers.

BACKGROUND OF THE INVENTION

Generally described, in a beverage liquid that is cooled below its freezing point (i.e., supercooled) ice crystals may form after energy is otherwise imparted to the beverage to initiate nucleation of the ice crystals. Because of this, supercooled beverages are increasingly popular due to the ability to create "slushy drinks" by nucleating the supercooled beverage and causing instant soft ice-crystal formation throughout the beverage.

Conventional carbonated soft drinks can contain sufficient energy such that the initial release of carbon dioxide that occurs when the container is opened initiates ice crystal nucleation. Specifically, the sudden drop of internal pressure caused by releasing gas from the supercooled carbonated beverage when the beverage closure is opened provides sufficient physical stimulation to initiate ice nucleation. However, relying on a drop in pressure limits the physical stimulation to only products with a sufficient amount of carbonation or other internal gas pressure. Moreover, non-carbonated beverages such as water, dairy-based beverages, sports drinks, coffees, teas, and the like, however, may require additional input energy to initiate ice crystal nucleation.

Another type of physical stimulation can include the use of ultrasound waves. When using an ultrasonic device, water or other fluid is used as a transmission medium for transmitting the ultrasonic energy between an ultrasound generator and a contact area of beverage product. Such a fluid transmission medium maximizes the ultrasonic conveyance and level of crystallization. However, use of water/transmission medium causes hygiene concerns for beverage products or troublesome and logistical concerns for operation of a shop.

Physical stimulation can also include applying an impact pressure by dropping or striking the beverage container against a surface. However, striking the beverage container, especially glass containers, causes risk of damage to the container, package labeling and product. Shaking or dropping a carbonated beverage may also cause unwanted foaming due to the carbonation within the beverage.

Furthermore, due to the temperatures required for nucleation to occur, users have roughly 90-120 seconds to begin the ice-crystal nucleation process once the beverage is removed from the supercooled refrigerated environment of a typical home freezer or that of a specialized merchandiser or vending machine, or the supercooled beverage may become too warm for ice-crystal nucleation to occur. Ideally, the supercooled beverage should either be nucleated before being dispensed by the vending machine, or by the consumer immediately upon removing the beverage from the cooler or vending machine without having to open the bottle.

Accordingly, there is a need for a beverage nucleator system that will not damage the product or product packaging, does not require a messy and possibly unhygienic transmission medium (i.e., a water bath), and can be implemented quickly and easily before the beverage begins to cool down.

SUMMARY OF THE INVENTION

The present disclosure is directed to a beverage nucleator system that can initiate ice crystal nucleation by application of a directed flow of pressurized gas to the exterior of the fluid container containing a supercooled beverage. The beverage nucleator system can include a frame having a beverage container aperture sized to receive a beverage container therein and a gas outlet positioned within the beverage container aperture for directing a flow of pressurized gas at a beverage container received therein.

The beverage nucleator system can further include a valve movable between an open and closed position for controlling the flow of pressurized gas through the gas outlet, where the valve is biased in a closed position and a timer coupled to a switch for controlling a timing of the valve in the open position. The timer can be configured to operate the valve in the open position for an amount of time between 100 msec-30 sec. The timer can also be configured to operate the valve in the open position for an amount of time between 1 sec-5 sec. The valve can comprise at least one of a mechanical, pneumatic and electrical valve.

The gas outlet can include a nozzle coupled to the valve, where the nozzle controls the direction and flow characteristics of a pressurized gas. The outlet opening of the nozzle can have a diameter between about 0.1" and about 0.005." The diameter of the outlet opening can also be between about 0.050" and about 0.010." The diameter of the outlet opening can also be between about 0.030" and about 0.010." The system can include a second nozzle spaced circumferentially around the beverage container aperture from the nozzle. The system can also include a third nozzle spaced axially along a length of the beverage container aperture from the nozzle.

An outlet opening of the nozzle can be located between about 1 mm and 7 mm from a beverage container received within the drink container aperture. The beverage container can include a body and a closure and the beverage container aperture is sized for receiving the body. The nozzle can be located in a side wall of the beverage container aperture such that the outlet opening is located adjacent the body of the beverage container received within the drink container aperture.

The beverage nucleator system can include a coupling sized to be coupled with a container of a compressed gas, the coupling can provide fluid communication between the container and the valve. The system can include a container of compressed gas. The container can be pressurized using at least one of nitrogen, carbon dioxide, and air.

The beverage nucleator system can include a power source coupled to the switch, where the switch can be coupled to a solenoid for moving the valve between the open and closed position. The system can also include a button positioned on the frame and configured to activate the timer.

The system can also include a pressure sensor within the drink container aperture configured to activate the timer upon sensing a threshold pressure. The system can also include a contact switch located on the frame, where the contact switch can be positioned adjacent the beverage container aperture.

The beverage nucleator system can also include a scanner configured to scan a beverage container received within the beverage container aperture to identify one or more characteristic components of the beverage container for identifying a product contained therein. The characteristic components of the beverage container can include at least one of a barcode, a label, and an identifying mark. The product identification can include identifying at least one of a type of food product, a type of packaging, and size of packaging. When the system includes a valve movable between an open and closed position for controlling the flow of pressurized gas through the gas outlet and a timer coupled to a switch for controlling a timing of the valve in the open position, the timing of the valve in the open position can be determined determined based the product identification. The system can also include a second gas outlet positioned with the beverage container aperture for directing a second flow of pressurized gas at a beverage container received within the beverage container aperture, and a second valve movable between an open and closed position for controlling the flow of pressurized gas through the second gas outlet, the second switch electronically coupled to the switch and the timer for controlling a timing of the second valve in the open position, where a timing of the second valve in the open position can be determined based on the product information.

In the present beverage nucleator system, the flow of pressurized gas can provide a point transmission of input energy.

In another aspect, the present invention is directed to a method of providing an iced beverage product. The method can include receiving a supercooled beverage in a beverage container such that a body of the beverage container is adjacent a gas outlet and directing a flow of pressurized gas at the body of the beverage container to cause ice crystal nucleation within the beverage. The method can further include moving a valve between an open and close position to control flow of the pressurized gas at the beverage container, where the valve is biased in a closed position. The method can further include activating a timer coupled to a switch for controlling a timing of maintaining the valve in the open position. The timer can be activated based on input received from at least one of a button positioned on the frame for input by a user, a pressure sensor sensing a pressure of the beverage container above a threshold pressure, and a contact switch activated by contact with the beverage container. The method can further include scanning the bottle to identify one or more characteristic components of the beverage container, determining a product identification of a product contained within the beverage container based on the characteristic component, determining the timing of maintaining the valve in the open position based on the product identification, and activating the timer according to the determined timing. The method can further include moving a second valve between an open and closed position to control a second flow of the pressurized gas at the bottle, where the second valve is biased in a closed position, where the timing of maintaining the second valve in the open position is determined based on the product identification The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The invention is explained in even greater detail in the following drawings. The drawings are merely examples to illustrate the structure of preferred devices and certain features that may be used singularly or in combination with other features. The invention should not be limited to the examples shown. In the drawings, like reference numbers and designations in the various drawings indicate like elements.

DETAILED DESCRIPTION

While there are several ways to initiate nucleation of ice crystals in a supercooled liquid, described herein is the use of pressurized gas directed at the side of the beverage container. As the pressurized gas is released, it quickly expands and experiences a rapid temperature drop. The sudden contact of the cold gas on the side of the beverage container initiates ice nucleation near the contact point. It is also contemplated that the shock wave caused by the impact of the pressurized gas on the side of the beverage container can be used to kick start the nucleation process. Specifically, described herein is a system and method for transferring energy to the supercooled liquid to initiate ice nucleation without risk of damage to the beverage or beverage container. Using the present device, an icy beverage may be formed from a beverage that is supercooled while also providing an improved consumer experience. Such stimulation enables almost all beverage products to be supercooled and have consistent ice crystal formation.

Accordingly, disclosed herein is a nucleator that may initiate ice crystal nucleation in any type of supercooled beverage and beverage container without the use of a fluid bath or other type of transmission medium. Specifically, it has been discovered that ice crystal nucleation can be consistently initiated via application of a directed flow of pressurized gas to the exterior of the fluid container containing a supercooled beverage container. The flow of gas can be directed to the body or the closure. Generally, the body is used as the contact point for the flow of gas because the body is in closer contact/proximity to the supercooled beverage than other parts of the product packaging. Using the body also ensures that the least loss of energy transmission will occur. The use of a pressurized flow of gas easily compensates for design variation among different beverage packaging types, which enables a more stable energy transmission without being influenced by the particular product package in use. Accordingly, the ice crystal nucleator disclosed herein facilitates application of directed flow of pressurized gas to the body of the beverage container to initiate nucleation of ice crystals in a supercooled beverage product contained therein.

In use, a consumer may insert a beverage product into the disclosed compressed gas nucleation device such that the gas outlet is adjacent or in contact with the body of the beverage product. Energy from the flow of the pressurized gas is transferred from the body to beverage liquid inside the package. This stimulation generates some ice crystals in the beverage liquid near inside surface of the container body. After applying the flow of pressurized gas, a consumer may remove the product from the device where any additional movement of the container facilitates propagation and generation of additional ice crystals throughout the supercooled beverage.

Figure 1:
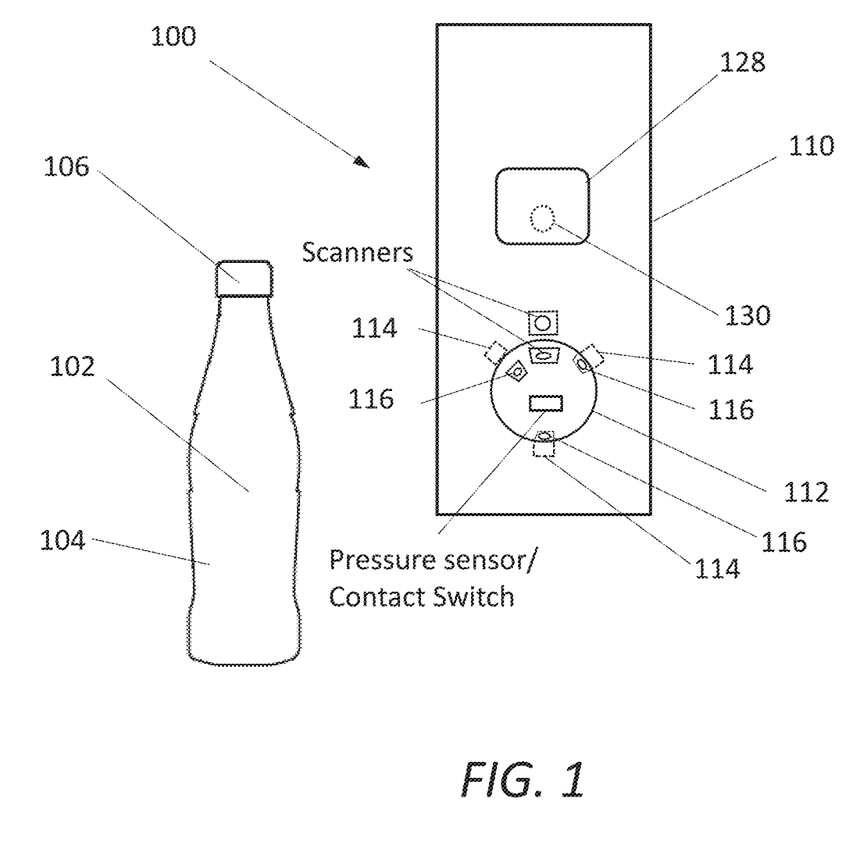
FIG. 1 is front view of an example beverage nucleator system.
Figure 2:
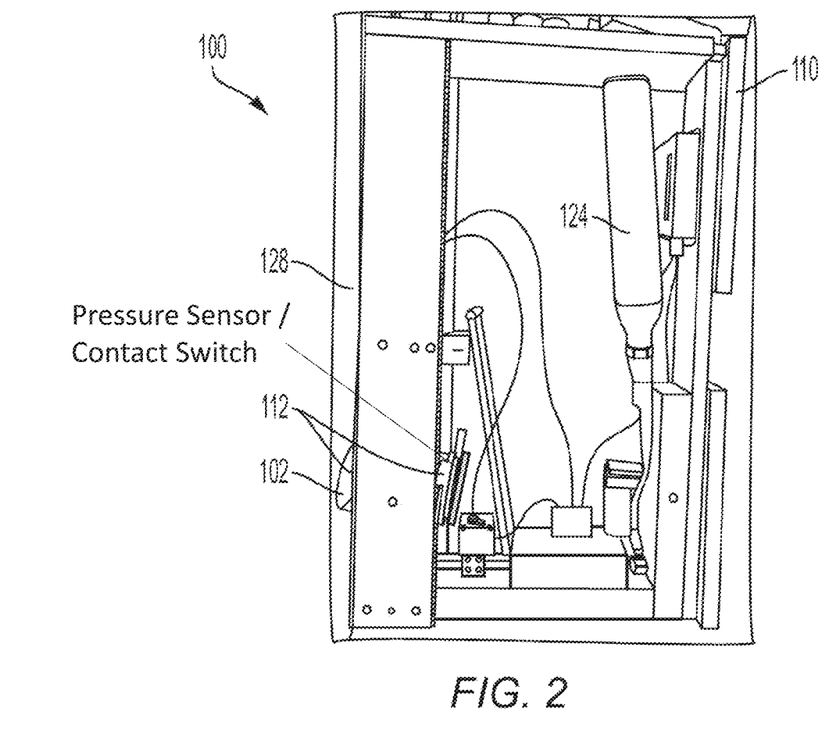
FIG. 2 is a side view of the internal components of beverage nucleator system of FIG. 1.

Referring now to the drawings, FIGS. 1 and 2 show an example of a beverage nucleator system 100 for a supercool beverage as may be described herein. While described herein as a supercooled beverage, any such fluid or flowable material may be used herein, such as for carbonated beverages, non-carbonated beverages, sodas, teas, coffee, water, milk, smoothies, drinkable yogurt, or other flowable food products with a slurry, suspension, heterogeneous, or homogeneous mixture of solids and liquids.

The beverage nucleator system 100 may be used with any type of beverage or other consumable flowable product, including both carbonated and noncarbonated products, within any type of conventional container 102 such as bottles, cans, and the like. The body 104 of the beverage container 102 may be made out of glass, metals, thermoplastics, or other types of materials. The beverage container 102 may be enclosed by a conventional closure 106. The closure 106 may be made out of metals, thermoplastics, or other types of materials. The closure 106 may include a cap, crown, tab, or any other type of closure. The closure 106 is opened by a consumer to gain access to the beverage contained within the beverage container 102.

Generally described, the beverage container 102 is maintained within a conventional cooler, vendor, vending machine, or the like at a uniform supercooled temperature. The supercooled temperature is below a freezing point of the beverage, but above a temperature at which homogeneous nucleation of the beverage occurs. Once removed from the cooler or other equipment, the beverage container 102 may be placed in the beverage nucleator system 100 to initiate nucleation of ice crystals in the beverage.

The beverage nucleator system 100 includes a frame 110 with an opening (beverage container aperture 112) sized to receive the beverage container 102. The frame 110 may be made out of any suitable type of rigid materials such as thermoplastics, stainless steels, and the like. The frame 110 may have any suitable size, shape, or configuration. Specifically, the frame 110 may be sized to allow a source of compressed gas and/or the necessary support structure to be positioned and supported therein.

The beverage container aperture 112 is sized to receive all or a portion of the beverage container 102. That is, both the body 104 and the closure 106 of the beverage container 102 may be positioned within the beverage container aperture 112. The interior surface of the beverage container aperture 112 can have a generally cylindrical shape with an opening at a proximal end for the beverage container 102 to pass through. A gas outlet 114 may be positioned within the beverage container aperture 112 for directing a flow of pressurized gas at a beverage container 102 received within the aperture 112. It is contemplated that the gas outlet 114 can be positioned at any point around the circumference of the interior surface of the beverage container aperture 112, or at any point along a length or an end surface of the beverage container aperture 112. It is also contemplated that multiple gas outlets 114 can be provided on the drink container aperture 112. For example, additional gas outlets 114 can be spaced circumferentially around the beverage container aperture 112 from the first gas outlet 114. Additional gas outlets 114 can be spaced axially along a length of the beverage container aperture 112 from the first gas outlet 114.

The beverage container aperture 112 allows for the beverage container 102 to come into close physical contact with the gas outlet 114. For example, the gas outlet 114 can be located between about 1 mm and 7 mm from a surface beverage container 102 received within the drink container aperture 112. In an example system, the gas outlet 114 is positioned at a location that is least likely to correspond to product labeling, such that the gas outlet 114 is located adjacent an unobstructed portion of the beverage container 102.

The gas outlet 114 can include a nozzle 116 for controlling the direction and flow characteristics of the pressurized gas. For example, the nozzle 116 can be selected to the control the rate of flow, speed, direction, mass, shape, and/or the pressure of the stream of gas being directed through the gas outlet 114 and towards the beverage container 102. The outlet opening of the nozzle 116 can have a diameter between about 0.10" and about 0.005." The outlet opening of the nozzle 116 can have a diameter between about 0.050" and about 0.010." The outlet opening of the nozzle 116 can have a diameter between about 0.030" and about 0.010." The nozzle 116 can be located in a side wall of the beverage container aperture 112 such that the outlet opening of the nozzle 116 is located adjacent and/or in contact with the beverage container 102. The nozzle 116 can be located within the drink container aperture 112 such that the outlet opening of the nozzle 116 is about 1 mm and 7 mm from a beverage container 102 received within the drink container aperture 112.

The beverage nucleator system 100 may also include a valve 118 movable between an open and closed position for controlling the flow of pressurized gas through the gas outlet 114/nozzle 116. The valve 118 may include a mechanical, pneumatic and electrical valve. Generally, the valve 118 is biased in a closed position. If an example beverage nucleator system 100 includes multiple gas outlets 114 as described above, each of the gas outlets 114 can be fluidly coupled to the gas supply via a separate valve 118. In another example each of the multiple gas outlets 144 can be fluidly coupled to the gas supply by a common/shared valve 118.

Figure 3:
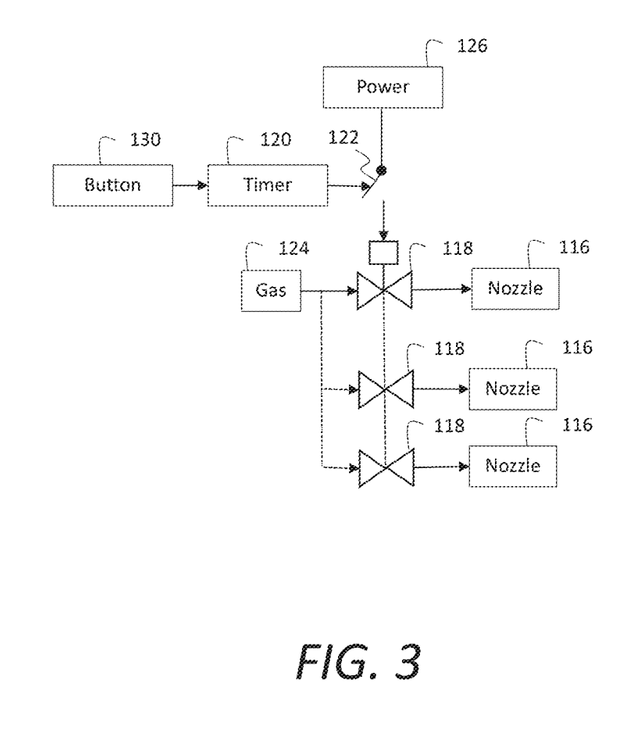
FIG. 3 is a schematic electrical diagram of the beverage nucleator system.

The beverage nucleator system 100 may also include a timer 120 coupled to a switch 122 for controlling a timing of the valve 118 in the open position. The timer may be configured to operate the valve 118 in the open position for an amount of time between 100 msec-30 sec. The timer may also be configured to operate the valve in the open position for an amount of time between 1 sec-5 sec.

The beverage nucleator system 100 may also include a coupling sized to join/couple a container of compressed gas 124 to the system. The coupling provides fluid communication between the container 124 and the valve 118. The container of compressed gas 124 can be pressurized using a at least one of nitrogen, carbon dioxide, and air, or a combination thereof. The container of compressed gas 124 can maintain the gas therein at pressure of about 700-1200 psi. As illustrated in FIG. 2, the container of compressed gas 124 is located internal to the frame 110 of the beverage nucleator system 100. It is also contemplated that the container of compressed gas 124 can be external to the beverage nucleator system 100 and fluidly coupled to the valve via tubing.

The beverage nucleator system 100 may also include a power source 126 coupled to a switch 122. The switch 122 can be coupled to a solenoid for moving the valve 118 between the open and closed position.

A user interface 128 is positioned on a front surface of the nucleator system 100. The user interface 128 may include one or more indicator lights or other displays that indicate the operational state of the nucleator system 100. The user interface 128 can include a digital display and/or a non-digital designated region on the front surface of the nucleator system 100. The user interface 128 may also include one or more buttons or switches actuatable by a user to activate operation of the nucleator system 100. As shown in FIG. 1, the user interface 128 includes an illuminated button 130. Pressing the button 130 activates operation of the nucleator system 100. For example, pressing the button 130 can initiate operation of the timer 120. Other types of activation devices such as a switch and the like also may be used herein. For example, a pressure sensor can be positioned within the drink container aperture 112 configured to activate operation of the nucleator system 100. That is, the pressure sensor can activate the timer 120 upon sensing a threshold pressure. The threshold pressure can correspond to the pressure of a filled beverage container 102. The threshold pressure can be greater than the weight of the filled beverage container 102 to ensure that a consumer is applying downward force of the beverage container 102. Other threshold pressures may be used without departing from the spirit or scope of the invention. Because the beverage nucleator system 100 is activated based on sensing the threshold pressure, a button need not be included on the user interface 128. In some implementations, both a button 130 and the pressure sensor may be used. For example, upon a consumer activating the button 130 on the user interface 128, a check may be performed to ensure that a threshold pressure is also sensed by the pressure sensor prior to activating the waterless ice crystal nucleator system 100.

A contact switch can also be used to activate operation of the beverage nucleator system 100. In contrast with the activation of the beverage nucleator system 100 through the use of a button 130 on the user interface 128, the beverage nucleator system 100 can be activated upon the beverage container 102 closing a contact switch. The contact switch can be located on the frame 110 and adjacent the opening to the beverage container aperture 112. The contact switch can also be located within the beverage container aperture 112. Because the beverage nucleator system 100 is activated based on the contact switch closing, a button 130 need not be included on the user interface 128. In some implementations, both a button 130 and the contact switch may be used. For example, upon a consumer activating the button 130 on the user interface 128, a check may be performed to ensure that the contact switch is also closed. In some implementations, any or all of the activation mechanisms described above may be used.

The beverage nucleator system 100 may also include a scanner configured to scan a beverage container 102 received within the beverage container aperture 112 to identify one or more characteristic components of the beverage container 102 for identifying a product contained therein. Based on the identification of the product, operation of the nucleator system 100 may be adjusted, e.g., timing of gas flow, volume of gas dispensed, pressure of gas dispensed, nozzle selection, etc. In some implementations, the beverage container aperture 112 may be coupled to a motor for rotating the beverage container 102 therein. Such rotation of the beverage container 102 during scanning facilitates identifying one or more characteristic components of the product, such as a barcode, label, or other identifying mark. Product identification includes identifying a type of food product (e.g., sugar sweetened carbonated beverage, diet carbonated beverage, juice beverage, smoothie, dairy beverage, yogurt product, etc.), type of packaging (e.g., PET carbonated beverage bottle, aluminum can, aluminum bottle, hot-fill PET beverage bottle, aseptic PET beverage bottle, etc.), and size of packaging (e.g., 20 fl. oz. package, 12 fl. oz. package, 8 fl. oz. package, etc.). Product identification may include identification of other features associated with the beverage contained within the beverage container 102, such as a brand of the product, packaging graphics including the locations of any product labeling on the beverage container 102, an advertising campaign associated with graphics on the product, or any other characteristic features of the product.

For example, the scanner may be a barcode scanner configured to read a barcode on the packaging of the beverage container 102. The scanner can also include two barcode scanners configured to emit an electromagnetic field at multiple locations along the beverage container 102. Including multiple barcode readers in the scanner facilitates identification of multiple different containers with barcodes located at different places on the packaging of the beverage container 102 and accounts for containers of varying heights.

In another example, the scanner may be one or more cameras configured to capture one or more images of the beverage container 102 which may be compared against one or more baseline product image or otherwise processed to identify the beverage container 102. In some implementations, the scanner may include the optical recognition system described in U.S. Pat. App. Pub. No. 2017/0024950 to Roekens et al., entitled "Merchandiser With Product Dispensing Chute Mechanism," hereby incorporated by reference in its entirety. Other beverage container 102 input and identification mechanisms are contemplated.

As described above, based on the identification of the product, operation of the nucleator system 100 may be adjusted. For example, the necessary timing of the valve in the open position may be determined and adjusted based on the identified product. Likewise, a pulse rate of the flow of gas may also be determined and adjusted, e.g., timed bursts of gas. The desired pressure of the gas being dispensed may also be determined and adjusted. It is contemplated that any of the flow characteristics of the pressurized gas being directed at the beverage container 102 can be determined and adjusted based on the product identification. Likewise, where the beverage nucleator system 100 includes multiple gas outlets 114/nozzles 116 it is contemplated that, based on the product identification, the operation of each of the gas outlets 114/nozzles 116 can be separately controlled as well as the desired flow characteristic of each of the gas outlets 114/nozzles 116 separately modified.

It is contemplated that the product information can be provided by the user at the user interface 128, and the operation of the timer 120 and nucleator system 100 may be adjusted in response to the user input.

The beverage nucleator system 100 may include a safety door covering all or part of the opening to the beverage container aperture 112. The safety door ensures that a user cannot reach into the beverage container aperture 112 while the system is in operation. As an additional safety mechanism, whenever the safety door is open, power may be removed from timer or any motors used by the scanner.

Figure 4:
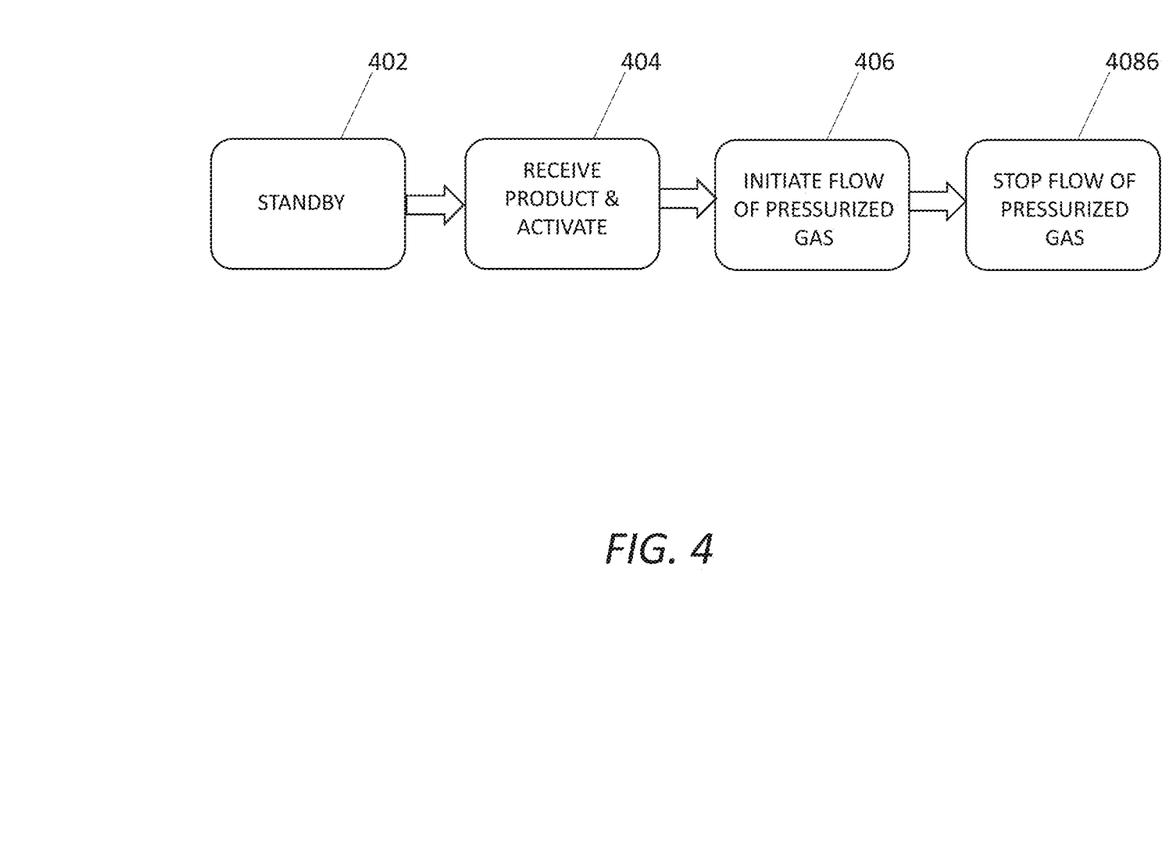
FIG. 4 is a flow chart of the operation of the beverage nucleator system.

FIG. 4 is a flow chart of the operation of a beverage nucleator system for a supercooled beverage as may be described herein. The method of FIG. 4 may be used with any of the above alternatives to the beverage nucleator system 100 described above. At 402, the beverage nucleator system 100 is in a standby state. At 404, a beverage container 102 containing a supercooled beverage is received in the beverage container aperture 112 and brought into close proximity with a gas outlet 114. The beverage nucleator system 100 is activated after receiving the beverage container 102. For example, the beverage nucleator system 100 may be activated upon one or more of receiving an input on an activation button 130 in a user interface 128, upon detecting a threshold pressure at a pressure sensor positioned within the drink container aperture 112, and/or upon detecting a contact switch is closed.

At 406, the beverage nucleator system 100 is activated to direct a flow of pressurized gas at the body of the beverage container 102 to cause ice crystal nucleation within the supercooled beverage. The ice crystal nucleation can be initiated by the sudden contact of the cold gas on the side of the beverage container 102 and/or the shock wave caused by the impact of the pressurized gas on the side of the beverage container 102. To direct the flow of pressurized gas, a valve 118 fluidly coupling a container of compressed gas 124 with the gas outlet 114 is moved between a closed and open position to open the flow of pressurized gas.

At 408, after a predetermined time period, the flow of pressurized gas is stopped. For example, a timer 120 coupled to a switch 122 can be used to control the timing of the valve in the open position. The timer 120 can be activated simultaneously with the activation of the beverage nucleator system 100. That is, a timer 120 can be activated upon one or more of receiving an input on an activation button 130 in a user interface 128, upon detecting a threshold pressure at a pressure sensor positioned within the drink container aperture 112, and/or upon detecting a contact switch is closed. For example, the predetermined time period may be between 1 sec-5 sec.

The predetermined time period for the flow of pressurized gas can be determined based on product information corresponding to the identification of a product contained within the beverage container 102. For example, the beverage nucleator system 100 can include a scanner that scans the beverage container to identify one or more characteristic components of the beverage container 102 (e.g., barcode, label, identifying mark). Based on the data received from the scanner, the product identification (e.g., type of food, packaging type, packaging size) can be determined to identify the product contained within the beverage container 102. Based on the product identification, the timing the valve 118 in the open position is determined and the timer 120 adjusted accordingly. For example, a supercooled carbonated beverage may require the valve 118 be open less time than a supercooled dairy-based beverage, according the time period of the timer 118 is shorter than the time period for a dairy-based beverage. As described above, it is also contemplated that the user can provide information at the user interface 128 providing identifying the product information and the valve 118 timing can be determined based on the user input.

In an example beverage nucleator system 100 including multiple gas outlets 114/nozzles 116, the timing of the various gas outlets 114 can be separately and individually controlled. For example, based on the product information. For example, based on the product information the type of food contained within the beverage container 102 can be determined and the operation of each of the gas outlets 114 and their corresponding valves 118 can be adjusted accordingly. Likewise, based on the product information the packaging type and size may be determined and the operation of each of the gas outlets 114 and their corresponding valves 118 can be adjusted accordingly. For example, a given packaging type may include product labeling, or portions of the beverage container 102 constructed of thicker material, at various locations along the beverage container 102. The operation of the gas outlets 114 and their corresponding valves 118 can be adjusted to provide operate a gas outlet 114 adjacent an unobstructed portion (i.e., no product label) or thinner material portion of the beverage container 102.

As described above, it is also contemplated that the user can provide information at the user interface 128 providing identifying the product information and the valve 118 timing can be determined based on the user input.

While the foregoing description and drawings represent the preferred embodiment of the present invention, it will be understood that various additions, modifications, combinations and/or substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. In addition, features described herein may be used singularly or in combination with other features. The presently disclosed embodiments are, therefore, to be considered in all respects as illustrative and not restrictive, the scope of the invention being indicated by the appended claims and not limited to the foregoing description.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention, as defined by the following claims.

What is claimed is:

1. A beverage nucleator system for a supercooled beverage container, comprising:
 a frame including a beverage container aperture sized to receive the beverage container therein;
 a gas outlet positioned within the beverage container aperture for directing a flow of pressurized gas at an exterior of the beverage container received therein, the gas outlet comprising a nozzle coupled to a valve, the nozzle controlling the direction and flow characteristics of the pressurized gas, the nozzle being located in a side wall of the beverage container aperture, wherein the valve is movable between an open position and a closed position for controlling the flow of the pressurized gas through the gas outlet, where the valve is biased in the closed position; and
 a timer coupled to a switch for controlling a timing of the valve in the open position, wherein the flow of pressurized gas provides a point transmission of input energy to cause ice crystal nucleation within the beverage container.

2. The beverage nucleator system of claim 1, wherein the nozzle is a first nozzle, the beverage nucleator system further including:
- a second nozzle spaced circumferentially around the beverage container aperture from the first nozzle.

3. The beverage nucleator system of claim 2, further comprising:
- a third nozzle spaced axially along a length of the beverage container aperture from the first nozzle.

4. The beverage nucleator system of claim 1, wherein the beverage container includes a body and a closure where the beverage container aperture is sized for receiving the body,
- wherein the nozzle is located in the side wall of the beverage container aperture such that the gas outlet is located adjacent the body of the beverage container received within the beverage container aperture.

5. The beverage nucleator system of claim 1, further including a container of compressed nitrogen or carbon dioxide.

6. The beverage nucleator system of claim 1, further including a power source coupled to the switch, wherein the switch is coupled to a solenoid for moving the valve between the open and closed positions.

7. The beverage nucleator system of claim 1, further including:
- a pressure sensor within the beverage container aperture configured to activate the timer upon sensing a threshold pressure.

8. The beverage nucleator system of claim 1, further including a contact switch located on the frame.

9. The beverage nucleator system of claim 8, wherein the contact switch is positioned adjacent the beverage container aperture.

10. The beverage nucleator system of claim 1, further including:
- a scanner configured to scan a beverage container received within the beverage container aperture to identify one or more characteristic components of the beverage container for identifying a product contained therein,
- wherein the characteristic components of the beverage container include at least one of a barcode, a label, and an identifying mark,
- wherein product identification includes identifying at least one of a type of food product, a type of packaging, and size of packaging.

11. The beverage nucleator system of claim 10,
- wherein the timing of the valve in the open position is determined based the product identification.

12. The beverage nucleator system of claim 11, further including:
- a second gas outlet positioned with the beverage container aperture for directing a second flow of pressurized gas at the beverage container received within the beverage container aperture, and
- a second valve movable between an open and closed position for controlling the flow of pressurized gas through the second gas outlet, wherein the switch is a first switch and a second switch electronically coupled to the first switch and the timer for controlling a timing of the second valve in the open position,
- wherein a timing of the second valve in the open position is determined based on the product identification.

\* \* \* \* \*